May 12, 1942. J. SUTH 2,282,502
PUMP LINER
Filed Jan. 31, 1941
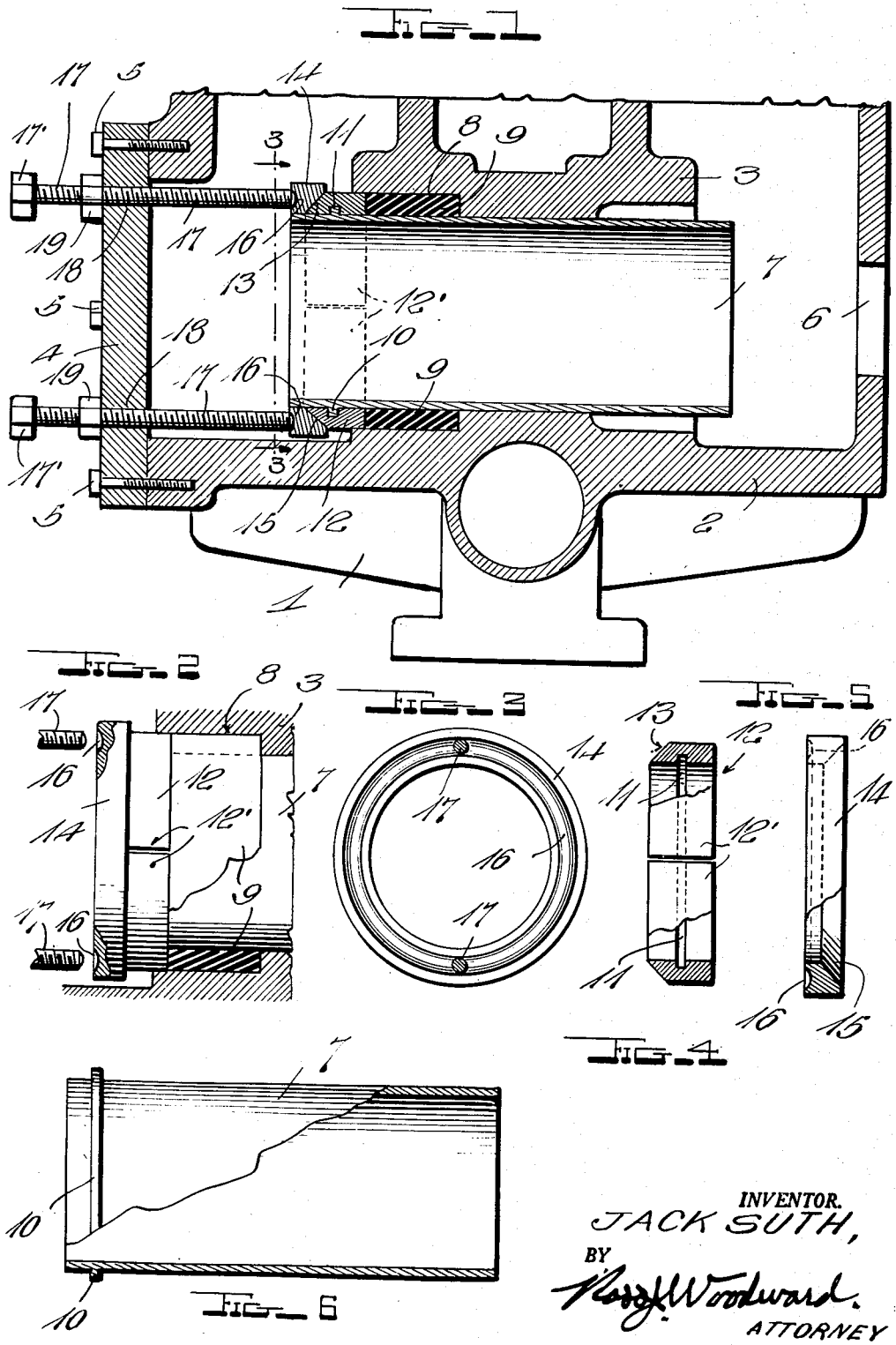
INVENTOR.
JACK SUTH,
BY
Ross J. Woodward.
ATTORNEY Patented May 12, 1942

2,282,502

UNITED STATES PATENT OFFICE 2,282,502

PUMP LINER

Jack Suth, Houston, Tex.

Application January 31, 1941, Serial No. 376,900

7 Claims. (Cl. 309—3)

This invention relates to a pump liner and more particularly to a liner for a pump of the type used in oil fields and known as mud pumps, it being one object of the invention to provide a liner of tubular formation which is adapted to be applied to the cylinder of a pump where it is firmly but removably held in place.

Another object of the invention is to provide a liner of such formation that when it is applied to the cylinder of a pump it will be firmly held and prevented from slipping out of proper position.

Another object of the invention is to provide a liner equipped with a packing which is seated in an annular recess or seat formed in the cylinder about the liner and compressed to tightly grip the liner when pressure is applied to the packing.

Another object of the invention is to provide a packing engaging ring so formed and applied to the liner that when pressure is applied to it to compress the packing, the ring will be constricted about the liner and held firmly in engagement with an outstanding bead carried by the liner so that the liner will be moved longitudinally with the ring during compressing of the packing and then prevented from slipping longitudinally through the cylinder or the compressed packing.

Another object of the invention is to provide the liner with a ring or collar for contracting the packing engaging ring, said ring or collar being adjusted through the medium of adjusting screws and having its outer end face formed with a groove or channel into which the screws fit so that when the screws are tightened to apply pressure to the rings and the packing they cannot slip laterally out of abutting engagement with the collar.

In the accompanying drawing:

Fig. 1 is a sectional view showing a pump equipped with a liner of the improved construction.

Fig. 2 is a fragmentary view showing the liner and associated parts partially in elevation and partially in section, portions of the adjusting screws being broken off.

Fig. 3 is a view on the line 3—3 of Fig. 1.

Fig. 4 is a view looking at a side of the split ring with portions shown in section.

Fig. 5 is a view showing the collar or solid ring in elevation with portions in section.

Fig. 6 is a view showing the liner partially in side elevation and partially in longitudinal section.

The pump, indicated in general by the numeral 1, has the usual body 2 formed from a cylinder 3. There has also been provided a head 4 which is secured to the body by a suitable number of screws 5 and disposed opposite one end of the cylinder 3. The usual opening 6 to receive a piston rod, is formed at the other end of the pump body. Other details of the pump have been omitted as they have no bearing on the invention.

The liner 7 consists of a metal cylinder of such diameter that it will fit snugly in the cylinder 3, as shown in Fig. 1, and of appreciably greater length than the length of the cylinder. The end of the cylinder confronting the head 4 is counterbored to form an annular recess or pocket 8 which is filled with rubber packing 9 and the end portion of the liner which protrudes toward the head is formed with a circumferentially extending bead or rib 10 which is rectangular in cross section, as shown in Figs. 1 and 6, and engages in an internal recess 11 formed in a compressing ring 12. This ring is a split ring and consists of companion sections 12' which fit about the liner as shown in Figs. 1 and 2, with their ends in close proximity to each other but free from each other. The outer end of the compressing ring is beveled to form a sloping edge face 13 and provide the ring with a tapered outer end portion. In view of the fact that the rib or bead 10 fits within the recess 11, the compressing ring will be held against movement along the liner and when pressure is applied to this ring to force it into the pocket 8 and compress the packing 9, the liner will be moved with the ring and held against longitudinal movement through the ring or the cylinder 3.

In order to force the ring 12 into the recess or pocket 8, there has been provided a solid ring or collar 14 which fits snugly about the liner and has its inner end portion internally beveled to provide a sloping face 15 which conforms to the bevel of the end face 13 of the spring ring 12 and fits snugly about the same when the solid ring is fitted about the liner and the tapered end portion of the compressing ring. This solid ring serves to construct the split ring about the liner and has its outer end face formed with a circumferentially extending groove 16 which is arcuate in cross section, as shown in Figures 3 and 5, and receives the rounded inner ends of the screws 17. These screws are engaged through threaded openings formed in the head 5 and provided with heads 17' at their outer ends so that the screws may be turned to shift them inwardly and force the collar longitudinally of the liner. As the collar moves inwardly under action of the screws, its beveled face 15 which fits about the beveled or tapered end of the split ring, will constrict the split ring into tight fitting engagement with the liner and also exert thrusting force to shift the split ring and the liner longitudinally until the packing 9 is compressed longitudinally and laterally expanded into close fitting, tight gripping engagement with the liner. The locking nuts 19 are then tightened to secure the screws and the packing will be held under pressure. The fact that the split ring is constructed about the liner prevents it from slipping out of place and since the bead or rib 10 is engaged in the groove or recess 11, the liner will be prevented from slipping longitudinally out of its proper position. By forming the outer end face of the solid ring with a groove 16 into which ends of the screws 17 engage, these screws will be prevented from slipping across the ring radially thereof and into the liner, instead of remaining in abutting engagement with the ring when the screws are turned in a tightening direction to urge the solid ring toward the split ring and the cylinder 3. When cleaning or replacements are needed, it is merely necessary to remove the screws 5 so that the head 4 can be lifted out of place and the liner and its rings may then be withdrawn, repairs made, and the parts reassembled and the head 4 replaced and again secured.

Having thus described the invention, what is claimed is:

1. In a pump including a body having a cylinder therein open at its ends, and a head mounted in closing relation to an opening in the body opposite one end of the cylinder in spaced relation thereto; a tubular liner fitting snugly in the cylinder with one end portion presented toward the closure head of the pump body, the cylinder being counterbored from the end confronting the head to form an annular recess, packing in the recess about the liner, a bead extending circumferentially about the protruding portion of the liner, a split ring surrounding the said end portion of the liner and formed with an internal groove receiving said bead, said split ring having its inner end abutting the packing and having its outer end externally beveled to provide a tapered end for the ring, a solid ring surrounding the outer end of the liner and having its inner end internally beveled and fitting snugly about the tapered end of the split ring, the outer end face of the solid ring being formed with a circumferentially extending groove, and screws threaded through the head with their inner ends seated in the groove for forcing the solid ring inwardly to constrict the split ring about the liner and shift the rings and the liner longitudinally to compress the packing in the recess tightly about the liner.

2. In a pump including a body having a cylinder therein open at its ends, and a head mounted in closing relation to an opening in the body opposite one end of the cylinder in spaced relation thereto; a tubular liner fitting snugly in the cylinder with one end portion presented toward the closure head of the pump body, the cylinder being counterbored from the end confronting the head to form an annular pocket surrounding the liner, packing in said pocket about the liner, a split ring removably fitting about the said end portion of the liner and interlocked with the liner to hold the ring and liner against longitudinal movement relative to each other, a solid ring surrounding the liner and having an internal cam surface in wedging fit about the split ring, and means carried by the head for engaging the solid ring and applying pressure thereto to constrict the split ring about the liner and shift the split ring and the liner longitudinally as a unit to compress the packing in the pocket about the liner.

3. In a pump including a body having a cylinder therein open at its ends, a tubular liner extending through said cylinder and fitting snugly therein, the end of the cylinder confronting the head being formed with an internal annular pocket surrounding the liner, packing in the pocket about the liner, a removable split ring surrounding the liner and interlocked therewith to prevent movement of the split ring along the liner, said ring having its inner end bearing against the packing, the outer end of the ring being externally tapered, a solid ring surrounding the liner outwardly of the split ring and having its inner end portion internally tapered and fitting about the externally tapered end of the split ring in wedging engagement therewith, and pressure applying means for engaging the outer end of the solid ring and forcing the same along the liner to constrict the split ring and shift the split ring and the liner longitudinally as a unit to a position for compressing the packing in the pocket tightly about the liner.

4. In a pump including a body having a cylinder therein open at its ends, a tubular liner of dimensions adapting it to pass through and fit snugly in said cylinder, the end of the cylinder confronting the head being formed with an internal annular pocket surrounding the liner, packing in the pocket about the liner, a split ring removably fitting about the liner and held against movement longitudinally thereof, the split ring having its inner end bearing against the packing, and means to constrict the split ring tightly about the liner and shift the ring and the liner longitudinally through the cylinder as a unit to a position for compressing the packing in the pocket tightly about the liner.

5. A pump liner comprising a tube of a length adapting it to pass through a pump cylinder, a rib extending about an end portion of said tube, a split ring for fitting about the said end portion of the tube formed with an internal circumferentially extending groove to receive said rib and hold the ring and tube against movement longitudinally of each other, a solid ring fitting snugly about the tube between the split ring and the said end of the tube, confronting ends of the rings being beveled to establish wedging fit of the solid ring about the split ring, and pressure applying means adapted to be threaded through a member and having abutting engagement with the solid ring.

6. A pump liner comprising a tube of a length and diameter adapting it to be received in a pump cylinder, a split ring fitting about an end portion of said tube and held against movement longitudinally thereon, said ring constituting means for compressing packing in a cylinder about the tubular lining, the outer end of the ring terminating short of the end of the tube and being externally beveled to form a tapered end, a solid ring fitting about the tube between the split ring and the end of the tube and having its inner end internally beveled and in wedging fit about the tapered outer end of the split ring, the outer end face of the solid ring being formed with a circumferentially extending groove, and pressure applying means for engaging in said groove and forcing the solid ring along the tube to constrict the split ring about the tube and urge the rings and tube longitudinally to cause the split ring to compress packing in a pump cylinder tightly about the tube.

7. A pump liner comprising a tube open at its ends, a split ring fitting about the tube and held against movement longitudinally thereon and having its outer end portion externally beveled to form a tapered outer end for the split ring, a solid ring fitting about the tube outwardly of the split ring and internally beveled for wedging fit about the adjoining tapered outer end of the split ring, and means for applying pressure to the solid ring longitudinally of the tube to force the solid ring along the tube and constrict the split ring about the tube and urge the split ring and tube longitudinally through a cylinder to compress packing in the cylinder tightly about the tube.

JACK SUTH.